US 6,568,289 B2

(12) United States Patent
Nakajima

(10) Patent No.: US 6,568,289 B2
(45) Date of Patent: May 27, 2003

(54) PLANAR SHAPE CHARACTERISTIC MEASURING APPARATUS AND PLANAR SHAPE CHARACTERISTIC MEASURING METHOD

(75) Inventor: Toshihiro Nakajima, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/860,498

(22) Filed: May 21, 2001

(65) Prior Publication Data

US 2002/0034151 A1 Mar. 21, 2002

(30) Foreign Application Priority Data

May 24, 2000 (JP) ........................................ 2000-157944

(51) Int. Cl.$^7$ ................................................ G01B 7/30
(52) U.S. Cl. .................... 73/865.8; 702/155; 356/141.1
(58) Field of Search ..................... 73/865.8; 702/155; 356/237.2, 239.2, 609, 612, 600, 139.9, 155, 141.1

(56) References Cited

U.S. PATENT DOCUMENTS

| 4,314,763 A | * | 2/1982 | Steigmeier et al. | ......... | 250/224 |
| 4,508,450 A | * | 4/1985 | Ohshima et al. | ....... | 250/559.45 |
| 5,815,255 A | * | 9/1998 | Van Ochten et al. | ....... | 356/138 |
| 5,983,167 A | * | 11/1999 | Ebisawa | ..................... | 702/155 |

FOREIGN PATENT DOCUMENTS

| JP | 10177729 | 6/1998 | ............ G11B/7/95 |
| JP | 2000048384 | 2/2000 | ............ G11B/7/95 |
| WO | WO 99/46603 | 9/1999 | |

OTHER PUBLICATIONS

European Search Report Dated Nov.15, 2002.

* cited by examiner

Primary Examiner—Daniel S. Larkin
Assistant Examiner—David Rogers
(74) Attorney, Agent, or Firm—Rader, Fishman & Grauer PLLC; Ronald P. Kananen, Esq.

(57) ABSTRACT

A planar shape characteristic measuring apparatus and method, which can precisely and efficiently measure the characteristics relating to a surface shape of the measured surface of a disk such as a data recording surface of an optical disk including a laser Doppler speed meter which detects a perpendicular direction speed of a measured surface of a rotating disk; a tilt angle calculating unit which calculates a tilt angle in the rotational direction of an optical disk at each measuring position to a reference surface based on a linear speed at each measuring position detected by the laser Doppler speed meter and the detected perpendicular direction speed; a displacement calculating unit which calculates a perpendicular direction displacement of the optical disk at each measuring position; an acceleration calculating unit which calculates a perpendicular direction acceleration; and a focus servo error calculating unit which calculates a focus servo error which is predicted to occur in a focus servo system.

20 Claims, 9 Drawing Sheets

PLANAR SHAPE CHARACTERISTIC MEASURING APPARATUS AND PLANAR SHAPE CHARACTERISTIC MEASURING METHOD

BACKGROUND OF THE INVENTION

1. Field of the Invention

The present invention relates to a planar shape characteristic measuring apparatus and a planar shape characteristic measuring method which measure, for example, characteristic values relating to the shape of a measured surface of a disk such as an optical disk.

2. Description of the Related Art

As shown in FIG. 7, a disk-shaped recording medium, that is, an optical disk 101, comprises an optical disk substrate 103 made of an optically transparent plastic provided on one surface with a data recording surface 104 and provided with a data recording area 102 within a predetermined area in the data recording surface 104.

Also, there are known an optical disk where the data recording area 102 in the data recording surface 104 is provided with, for example, as shown in FIG. 8A, a continuous groove 105 and a land 106 adjacent thereto provided spirally for every track by a predetermined track pitch 109 (1 to 2 $\mu$m) on the data recording surface 104 of one side of the disk substrate 103 and an optical disk where, as shown in FIG. 8B, the data recording surface 104 is provided with a series of pits 108 spirally for every track by a predetermined track pitch.

For example, in most data recordable optical disks of the phase-changing type or opto-magnetic type, a phase changing film or a magnetic film, a light reflecting layer, and a protective film layer (all not shown) are formed in that order on the data recording surface 104 on which the grooves 105 shown in FIG. 8A is provided. One of the grooves 105 and the lands 106 on the data recording surface 104 is used as a recording area, while the other is used as a light reflecting area for tracking.

Also, in most write-once (read-only) type optical disks, a light reflecting layer and a protective film layer (both not shown) are formed in that order on the data recording surface 104 on which the series of the pits 108 shown in FIG. 8B is provided. The series of the pits 108 on the data recording surface 104 is used as both a recording area and a diffraction grating for tracking.

In an optical disk having the above configuration, a laser beam condensed by an object lens (not shown) mounted on an optical pickup is fired from the non-data surface 107 at the side opposite to the data recording surface 104 of the optical disk substrate 103 while rotating the optical disk.

In a data recordable optical disk, information is optically recorded in a recording layer on the land 106 by the beam or the information optically recorded on the recording layer is read by the reflected light beam. Further, for example the light beam reflected from the groove 105 is detected for tracking so that the laser beam for recording or reproduction is always focused on a predetermined track.

In a write-once type (read-only) optical disk, information is read and tracking performed by detecting the reflected and diffracted beam from the surface 104 provided with the series of pits 108 due to the beam from the non-data surface 107 to the optical pickup.

On the other hand, in the high density optical disks being developed in recent years, as shown in FIG. 9, ones are known having an optical disk substrate 103 provided with grooves 105 and formed with a light reflecting surface 104 comprising a light reflecting layer and a phase change film or a magnetic film and a transparent layer 111 which has a constant thickness of about 0.1 mm in that order.

Similarly, in a write-once type (read only) optical disk, there is known an optical disk formed with a light reflecting surface 104 comprising a light reflecting layer and a transparent layer 111 having a constant thickness about 0.1 mm in that order.

In the case of an optical disk formed with a film in this way, an optical pickup (not shown) is arranged at the side of the transparent layer 111 formed on the surface 104 of the optical disk substrate 103 and fires a laser beam while the optical disk is being rotated.

Summarizing the problems to be solved by the present invention, the optical disk substrate 103 is generally formed by injection molding of plastic. In an optical disk substrate 103 formed by this method, it is known that warping occurs along with heat distortion at the time of molding and changes in the environment such as the air temperature or humidity. Further, undulation occurs at the surface of the disk due to warping of the molds at the time of molding.

If rotating the optical disk substrate 103 in a state with warping or unevenness of undulation, up-down vibration occurs at the surface of the optical disk substrate 103 leading to the focal position of a data reading lens deviating from the data recording surface of the disk (defocus state) or the data recording surface becoming tilted from a focal surface of the data reading lens (skew state).

At this time, a spot condensed by the optical pickup ends up being influenced by the aberration. The magnitude of the aberration depends on the numerical aperture (NA) of a pickup lens. The aberration caused by the defocus is proportional to the second power of the numerical aperture (NA), while the aberration caused by the skew is proportional to the third power of the numerical aperture (NA). That is, due to the larger numerical aperture (NA), the allowable defocus and skew become smaller.

On the other hand, the smaller the thickness from the surface of the disk to the data recording surface 104, the smaller the aberration due to the defocus and the skew. For this reason, along with the recent higher density of optical disks, the numerical aperture (NA) has become higher and the thickness of the disk has become smaller.

For example, the high density optical disk such as shown in FIG. 9 is structured with a thin transparent layer 111 of a thickness of about 0.1 mm placed on the data recording surface 104 on which the grooves and the lands or the series of pits of the disk substrate 103 are formed.

Thus, to decrease or avoid the influence of the aberration caused by the increase of the numerical aperture (NA), an optically thin disks are being developed. Recently, a high density disk having a short wavelength ($\lambda \leq 430$) and a large numerical aperture (NA$\geq$0.76) has been proposed.

Because the depth of focus becomes shallower along with the higher NA as stated above, stricter values are now demanded for the surface vibration permitted to the optical disk substrate 103, that is, the magnitude of the unevenness of the surface of the optical disk substrate 103.

For this reason, it is necessary to accurately measure the characteristics relating to the shape of the surface of the optical disk substrate 103. For example, it is demanded to precisely and efficiently measure the unevenness of the surface of the optical disk substrate 103, the amount of focus servo error making it impossible to track the unevenness of the surface of the optical disk substrate 103 generated at the time of focus servo control or the so-called "tangential skew", and other planar shape characteristics.

SUMMARY OF THE INVENTION

An object of the present invention is to provide a planar shape characteristic measuring apparatus and a planar shape characteristic measuring method which can precisely and efficiently measure characteristics relating to the shape of a measured surface of a disk such as a data recording surface of an optical disk.

According to a first aspect of the present invention, there is provided a planar shape characteristic measuring apparatus comprising a speed detecting means for detecting a perpendicular direction speed of a measured surface of a rotating disk and a tilt angle calculating means for calculating a tilt angle in the rotational direction of said measured surface relative to a reference surface at each measuring position based on the linear speed at each measuring position detected by said speed detecting means and the detected perpendicular direction speed.

Preferably, the planar shape characteristic measuring apparatus further comprises a digital filtering means for removing a noise component contained in speed data detected by said speed detecting means and a filter coefficient calculating means for calculating a filter coefficient in accordance with a sampling rate of said speed detecting means so that a filter characteristic of said digital filtering means becomes a predetermined filter coefficient.

Preferably, said tilt angle calculating means uses a value of said perpendicular direction speed divided by said linear speed as a tangent of said tilt angle and calculates said tilt angle by an inverse function of the tangent.

Alternatively, the planar shape characteristic measuring apparatus further comprises a rotating means for rotating said disk; a moving means for relatively moving said speed detecting means in the radial direction of said disk; an input means for inputting a radius of said disk at a measuring position detected by said speed detecting means and a target linear speed at said measuring position; and a control means for calculating a speed for rotating said disk based on the input radius and target linear speed, rotating said disk at the calculated speed, and outputting a control command for moving said speed detecting means to the measuring position of said input radius to said rotating means and moving means.

Preferably, said speed detecting means detects said perpendicular direction speed by a non-contact means at a measured surface of said disk.

Preferably, said speed detecting means comprises a laser Doppler speed meter.

Preferably, said disk comprises a recording medium enabling at least one of optically recording and reproduction of information; and said measured surface comprises a data recording surface of said recording medium.

Alternatively, the planar shape characteristic measuring apparatus further comprises a displacement calculating means for calculating a perpendicular direction displacement of said measured surface based on the detected perpendicular direction speed; an acceleration calculating means for calculating a perpendicular direction acceleration of a measured surface of said disk at each detecting position based on the detected perpendicular direction speed; and a focus servo error calculating means for calculating an amount of focus servo error which does not able tracking of unevenness of said measured surface predicted to occur in a servo system for making a predetermined object track a target position in a perpendicular direction from a measured surface of said rotating disk based on the detected perpendicular direction speed and a gain characteristic of said servo system.

More preferably, said object is an optical pickup for performing at least one of recording of information onto a data recording surface of said recording medium and reproduction of information from said data recording surface or a lens mounted on said optical pickup; and said servo system comprises a focus servo system for making the focus of the optical pickup or the lens mounted on said optical pickup track a target position in a direction perpendicular to said data recording surface.

Preferably, said focus servo error calculating means comprises a band-pass filter for removing high and low frequency noise components contained in detected perpendicular direction speed data and an integrator for integrating by time series the output from said band-pass filter.

According to a second aspect of the present invention, there is provided a planar shape characteristic measuring method comprising a speed detecting step for detecting a perpendicular direction speed of a measured surface of a rotating disk and a tilt angle calculating step for calculating a tilt angle in the rotational direction of said measured surface with respect to a reference surface at each measuring position based on a linear speed of said measured surface at each measuring position and the detected perpendicular direction speed.

Preferably, the method further comprises a filtering step for removing a noise component contained in speed data detected in said speed detecting step by a digital filter and a filter coefficient calculating step for calculating a filter coefficient in accordance with a sampling rate of said speed detecting step so that a filter characteristic of said digital filter becomes a predetermined filter characteristic.

Preferably, said tilt angle calculating step uses a value of said perpendicular direction speed divided by said linear speed as a tangent of said tilt angle and calculates said tilt angle by an inverse function of the tangent.

Preferably, said speed detecting step comprises a step for inputting a radius of said disk at a measuring position and a target linear speed at said measuring position, a step for calculating a speed for rotating said disk based on the input radius and target linear speed and for rotating said disk at the calculated speed, and a step for moving a predetermined speed detecting means which detects said perpendicular direction speed to the measuring position of the input radius.

Alternatively, said speed detecting step detects said perpendicular direction speed by a noncontact means at a measured surface of said disk.

More preferably, said speed detecting step detects said perpendicular direction speed by a laser Doppler speed meter.

Preferably, a recording medium which enables at least one of optical recording and reproduction of information is used for said disk; and said measured surface comprises a data recording surface of said recording medium.

Alternatively, the method further comprises a displacement calculating step for calculating a perpendicular direction displacement of said measured surface based on the detected perpendicular direction speed; an acceleration calculating step for calculating a perpendicular direction acceleration of a measured surface of said disk at each detecting position based on the detected perpendicular direction speed; and a focus servo error calculating step for calculating an amount of focus servo error which does not able tracking of unevenness of said measured surface predicted to occur in a servo system for making a predetermined object track a target position in a perpendicular direction from a measured surface of said rotating disk based on the detected perpendicular direction speed and a gain characteristic of said servo system.

More preferably, said object is an optical pickup for performing at least one of recording of information onto a data recording surface of said recording medium and reproduction of information from said data recording surface or a lens mounted on said optical pickup; and said servo system comprises a focus servo system for making the focus of the optical pickup or the lens mounted on said optical pickup track a target position in a direction perpendicular to said data recording surface.

More preferably, said focus servo error calculating step removes high and low frequency noise components contained in the detected perpendicular direction speed data by a band-pass filter and calculates said amount of focus servo error by integrating by time series the output from this band-pass filter.

In the present invention, the perpendicular direction speed of a rotating disk is detected and the tilt angle in the rotational direction at the measuring position, the so-called tangential skew, is calculated from the detected perpendicular direction speed and the linear speed at a measuring position.

The linear speed at a measuring position can be specified from a radius of the measuring position and a speed of the disk. Because the perpendicular direction speed of the disk is a value detected directly by a laser Doppler speed meter for example, the precision of calculation of the tangential skew can be increased.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Preferred embodiments of the present invention will be described below with reference to the drawings.

Figure 1:
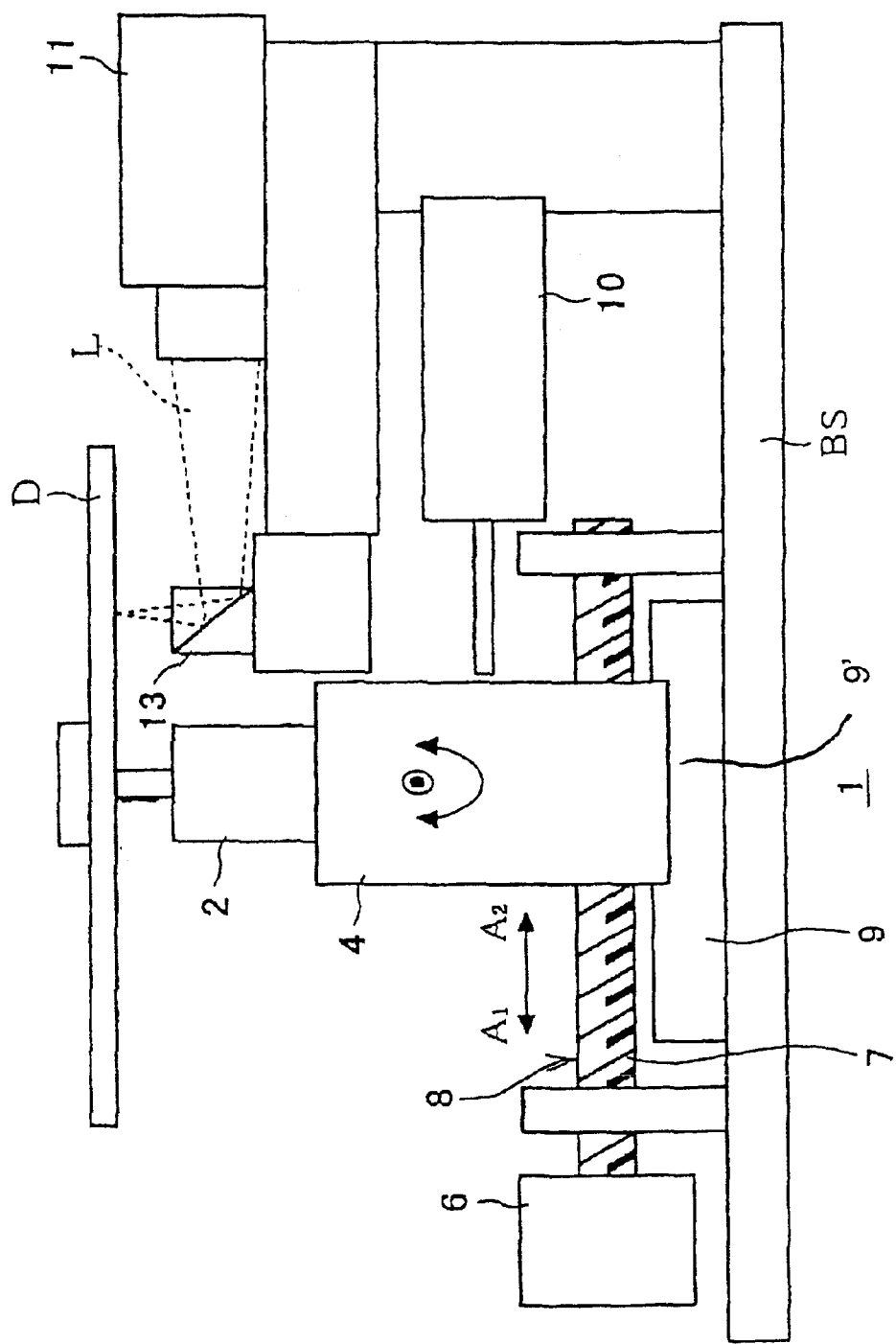
FIG. 1 is a view of the configuration of a planar shape characteristic measuring apparatus according to an embodiment of the present invention.

FIG. 1 is a view of the configuration of a planar shape characteristic measuring apparatus according to an embodiment of the present invention.

As shown in FIG. 1, a planar shape characteristic measuring apparatus 1 comprises a spindle motor 2 which holds and rotates an optical disk D as a disk-shaped recording medium, a tilting stage 4 for adjusting a tilt of the rotating shaft of the spindle motor 2, a slide motor 6, a sliding mechanism 8, a laser Doppler speed meter 11, and a potentiometer 10.

Here, the spindle motor 2 corresponds to one embodiment of the rotating means of the present invention, while the slide motor 6 and the sliding mechanism 8 constitute the moving means of the present invention.

The optical disk D is provided, for example, with a 0.1 mm light transparent layer on a data recording surface. The data recording surface of the optical disk D comprises a light reflecting surface formed by, for example, a metal film by vapor deposition and reflecting light.

However, the optical disk D is not limited to a disk having a 0.1 mm transparent layer on a light reflecting surface. Other various kinds of optical disks may be used.

The slide mechanism 8 movably holds the slide base 9 in the radial direction of the optical disk D.

The slide motor 6 rotates a screw shaft 7 which is rotatably held on a base BS in the slide mechanism 8.

This screw shaft 7 is screwed into the slide base 9. The slide base 9 is movably guided by a slide base member 9 which is provided on a base BS and moves in the direction of arrows A1 and A2 by the rotation of the screw shaft 7.

The potentiometer 10 is fixed on the base BS. This potentiometer 10 detects the position of the spindle motor 2 in the slide direction of the slide mechanism 8 shown by the arrows A1 and A2, that is, the position of the optical disk D.

The laser Doppler speed meter 11 fires a laser beam L toward a prism 13. The prism 13 makes the laser beam L which is output from the laser Doppler speed meter 11 strike the data recording surface of the optical disk D.

At this time, the laser Doppler speed meter 11 and the prism 13 are adjusted in height so that the light beam is focused on the data recording surface of the optical disk D.

If the optical disk D has a speed component in a direction perpendicular to the data recording surface of the optical disk D, the light beam reflected at the data recording surface is shifted in its frequency by the Doppler effect. Therefore, the laser Doppler speed meter 11 detects the speed of the optical disk D in the direction perpendicular to the data recording surface of the optical disk D by comparing the output laser beam with the reflected light beam.

The laser beam L output from the laser Doppler speed meter 11 may be focused at any radial position of the optical disk D by changing the position of the slide mechanism 8.

Figure 2:
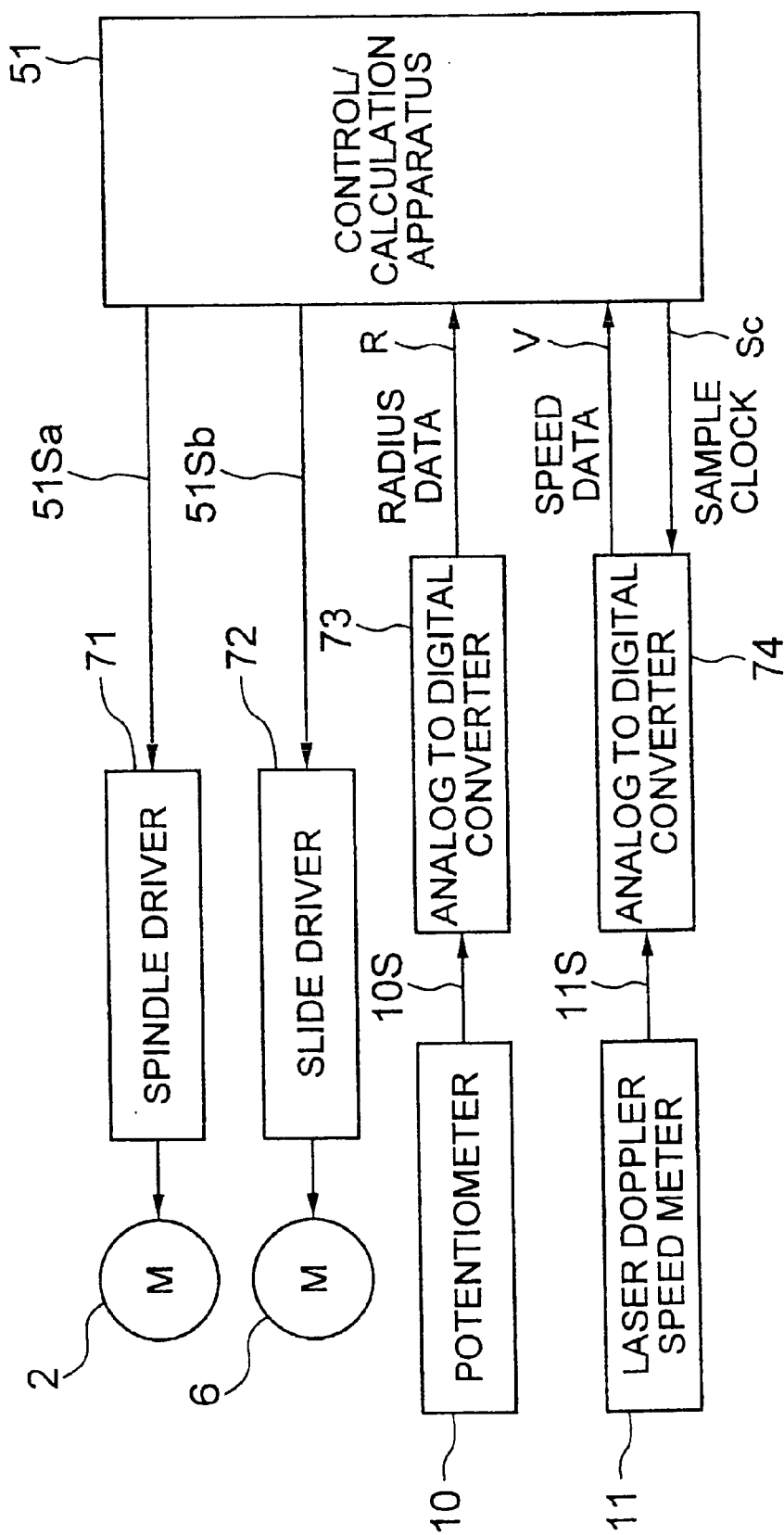
FIG. 2 is a view of the configuration of a control system of a planar shape characteristic measuring apparatus according to an embodiment of the present invention.

FIG. 2 is a view of the configuration of a control system of a planar shape characteristic measuring apparatus according to an embodiment of the present invention.

In FIG. 2, the planar shape characteristic measuring apparatus 1 further comprises a control/processing apparatus 51, a spindle driver 71 for driving the spindle motor 2, and a slide spindle driver 72 for driving the slide motor 6.

The control/processing apparatus 51 comprises a personal computer for example and is provided with a man-machine interface such as a keyboard, a mouse, and a display.

The control/processing apparatus 51 comprises, for example, an analog-to-digital converter 73 which converts a detected signal 10S detected by the potentiometer 10 to a digital signal of a predetermined form and an analog-to-digital converter 74 which converts a detected signal detected by the laser Doppler speed meter 11 to a digital signal of a predetermined form.

The analog-to-digital converter 74 samples the detected signal of the laser Doppler speed meter 11 at a sampling rate determined by a signal Sc output from the control/processing apparatus 51.

The spindle driver 71 provides the spindle motor 2 with a drive current in accordance with the output control signal 51Sa output from the control/processing apparatus 51.

The slide driver 72 provides the slide motor 6 with a drive current in accordance with the output control signal 51Sb from the control/processing apparatus 51.

Figure 3:
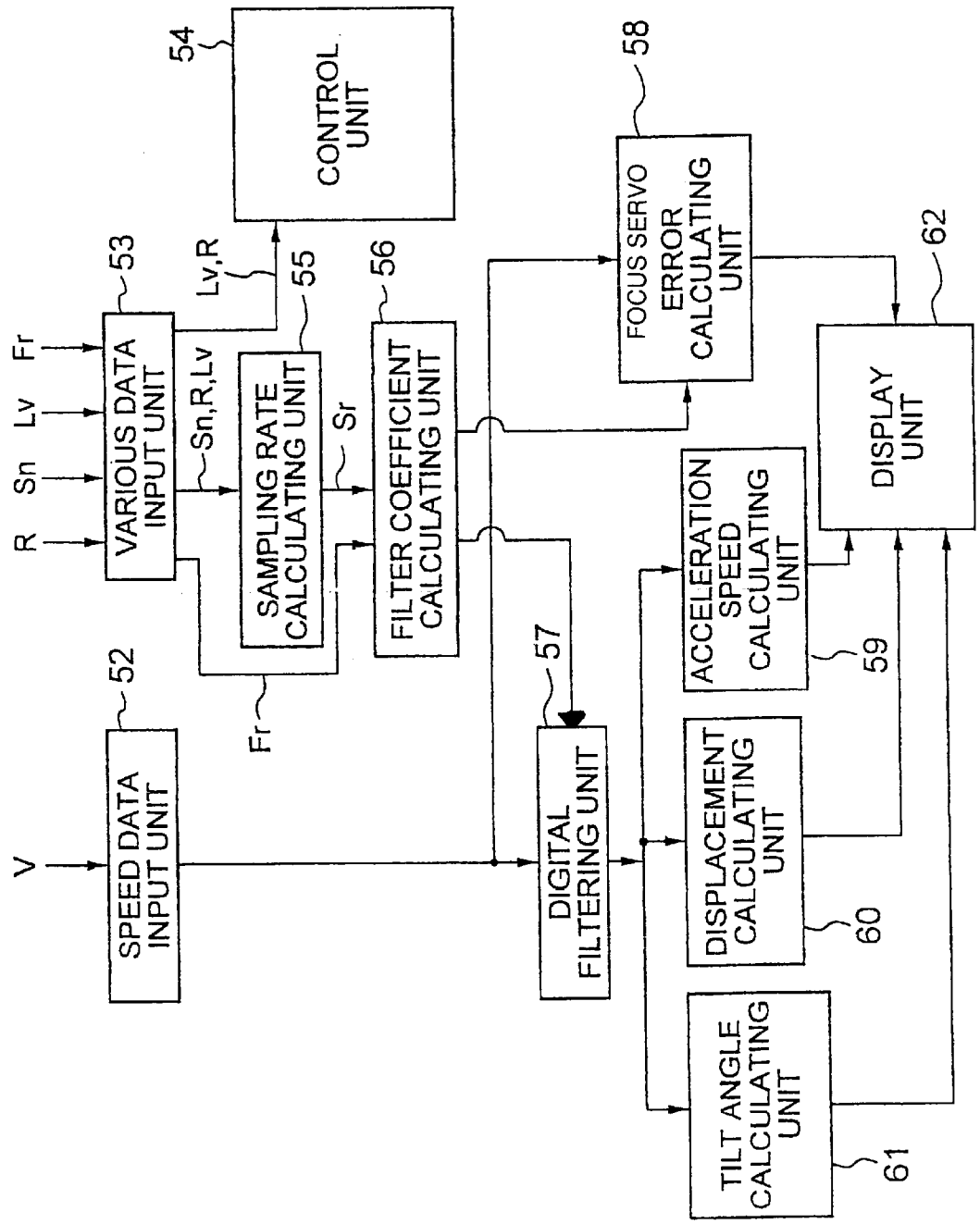
FIG. 3 is a view for describing the configuration of a control/processing apparatus.

FIG. 3 is a view for describing the configuration of the control/processing apparatus 51.

As shown in FIG. 3, the control/processing apparatus 51 comprises a speed data input unit 52, a data input unit 53, a control unit 54, a sampling rate calculating unit 55, a filter coefficient calculating unit 56, a digital filtering unit 57, a focus servo error calculating unit 58, a tilt angle calculating unit 61, a displacement calculating unit 60, an acceleration calculating unit 59, and a display unit 62.

Here, the data input unit 53, the control unit 54, the filter coefficient calculating unit 56, the digital filtering unit 57, the focus servo error calculating unit 58, the tilt angle calculating unit 61, the displacement calculating unit 60, and the acceleration calculating unit 59 correspond to one embodiment of the input means, the control means, the filter coefficient calculating means, the filtering means, the focus servo error calculating means, the tilt angle calculating means, the displacement calculating means, and the acceleration calculating means of the present invention, respectively.

The speed data input unit 52 receives as input and holds perpendicular direction speed data V of the data recording surface of the optical disk D detected by the laser Doppler speed meter 11.

The data input unit 53 receives as input and holds radius data R at a measuring position of the optical disk D detected by the laser Doppler speed meter 11 and a target linear speed Lv at the measuring position.

Further, the data input unit 53 receives as input and holds the number Sn of data samplings per rotation of the optical disk D having a speed V detected by the laser Doppler speed meter 11.

Further, the data input unit 53 receives as input a filter characteristic for the digital filtering unit 57 and a filter characteristic Fr for the focus servo error calculating unit 58. Concretely, this filter characteristic Fr is a gain characteristic of the digital filtering unit 57 and the focus servo error calculating unit 58.

The control unit 54 calculates a speed N of the optical disk D based on the radius data R and the target linear speed Lv at a measuring position input to the data input unit 53 and outputs a control command 51Sa for rotating the optical disk D at the calculated speed N to the spindle driver 71, as also seen in FIG. 2.

Further, the control unit 54 outputs to the slide driver 72 a control command 51Sb for moving the measuring position of the optical disk D measured by the laser Doppler speed meter 11 to the measuring position of the radius data R input to the data input unit 53. Concretely, the control unit 54 controls the radial position of the spindle motor 2 based on the position of the spindle motor 2 fed back from the potentiometer 10.

The sampling rate calculating unit 55 calculates a sampling rate Sr from the radius data R of a measuring position, the target linear speed Lv, and the number Sn of data samplings input to the data input unit 53.

The filter coefficient calculating unit 56 calculates a filter coefficient of the digital filtering unit 57 and the focus servo error calculating unit 58 based on the sampling rate Sr which is calculated in the sampling rate calculating unit 55 and the filter characteristic which is input to the data input unit 53. The digital filtering unit 57 is preferably a digital filter.

The digital filtering unit 57 comprised a low-pass filter for removing for example noise due to dust or scratches on the surface of the optical disk D and noise of high frequency in a data transmission system etc. contained in the speed data V detected by the laser Doppler speed meter 11 used in the tilt angle calculating unit 61, the displacement calculating unit 60, and the acceleration calculating unit 59. This low-pass filter is realizable by an IIR digital filter for example.

The filter coefficient which determines the filter characteristic of this low-pass filter is calculated in the filter coefficient calculating unit 56.

The tilt angle calculating unit 61 calculates a tilt angle in the rotational direction of the data recording surface of the optical disk D at each measuring position with respect to a reference surface based on the linear speed (scan speed) Vs at each measuring position in the optical disk D by the laser Doppler speed meter 11 and the perpendicular direction speed V detected by the laser Doppler speed meter 11.

Figure 4:
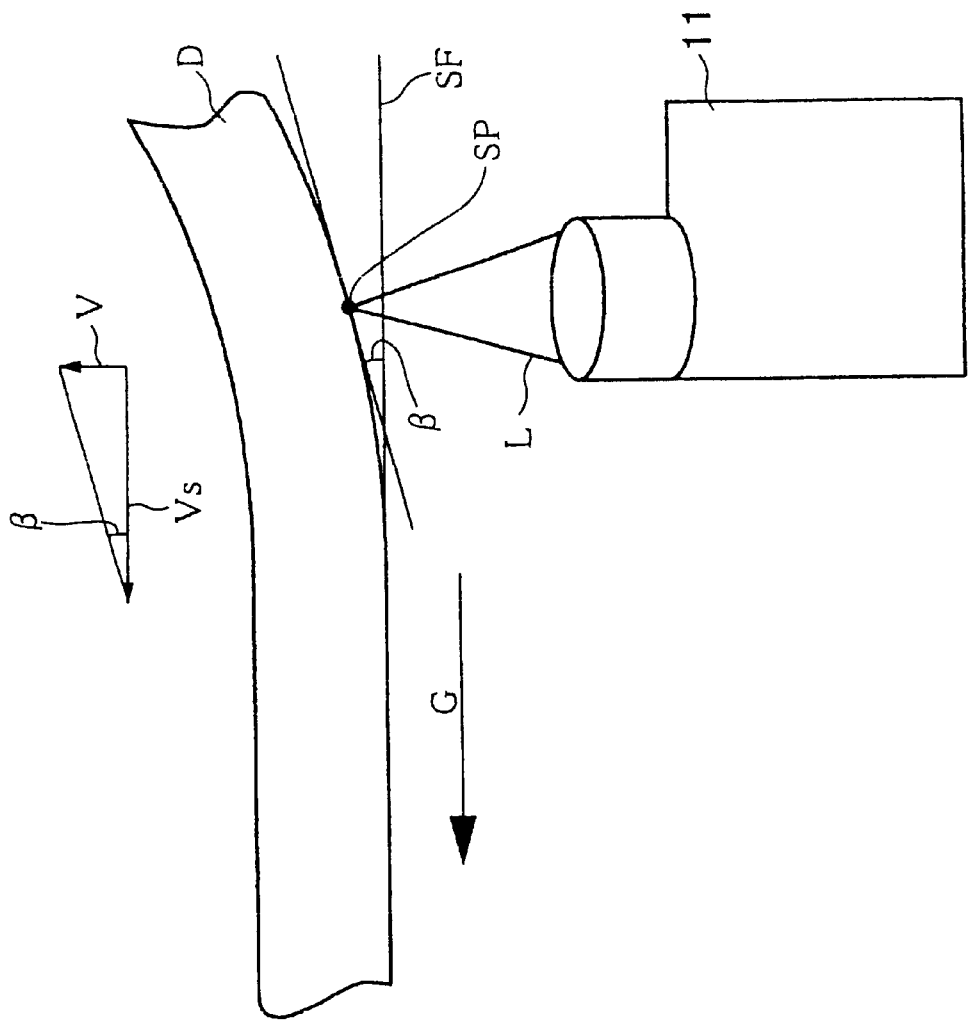
FIG. 4 is a view for describing a method of calculation of the tilt angle in the rotational direction in the present invention.

Concretely, as shown in FIG. 4, if the tilt angle of the measured position SP in the rotational direction with respect to a reference surface SF (tangential skew) measured by the laser Doppler speed meter 11 of the optical disk D rotating in the direction of an arrow G is $\beta$, then the value V/Vs obtained by dividing the perpendicular direction speed V of the optical disk D at the measuring position SP by the linear speed Vs at the measuring position SP equals tan $\beta$.

Therefore, the tilt angle $\beta$ can be calculated by an inverse function of this tangent as described in the following equation (1):

$$\beta = \tan^{-1}(V/Vs) \qquad (1)$$

The displacement calculating unit 60 calculates the perpendicular direction displacement of the data recording surface of the rotating optical disk D by integrating the perpendicular direction speed V detected by the laser Doppler speed meter 11.

The acceleration calculating unit 59 calculates the perpendicular direction acceleration of the data recording surface of the rotating optical disk D by differentiating the perpendicular direction speed V detected by the laser Doppler speed meter 11.

The focus servo error calculating unit 58 calculates an amount of focus servo error which does not enable tracking of unevenness of the data recording surface of the optical disk D predicted to occur in a servo system for making a predetermined object track a target position in a perpendicular direction from a measured surface of said rotating disk based on the perpendicular direction speed detected by the laser Doppler speed meter 11 and a gain characteristic of said servo system.

Concretely, the focus servo error calculating unit 58 calculates the amount of focus servo error of a focus servo system for making the focus of an optical pickup which carries out at least one of recording of information on the data recording surface and reproduction of information from the data recording surface of the optical disk D or a lens mounted on the optical pickup track a target position in a direction perpendicular to the data recording surface.

The focus servo error calculating unit 58 comprises a band-pass filter of a filter characteristic input to the data input unit 53 and an integrator for integrating the output from this band-pass filter. These band-pass filter and integrator can be constructed by an IIR digital filter for example.

This band-pass filter is provided with a transfer function characteristic of the above focus servo system and further has a characteristic of removing low frequency noise in surface vibration of the disk D and high frequency noise in a transmission system etc.

The display unit 62 displays the results obtained in the tilt angle calculating unit 61, displacement calculating unit 60, acceleration calculating unit 59, and focus servo error calculating unit 58 on a display screen of a display apparatus after processing to predetermined forms.

Figure 5:
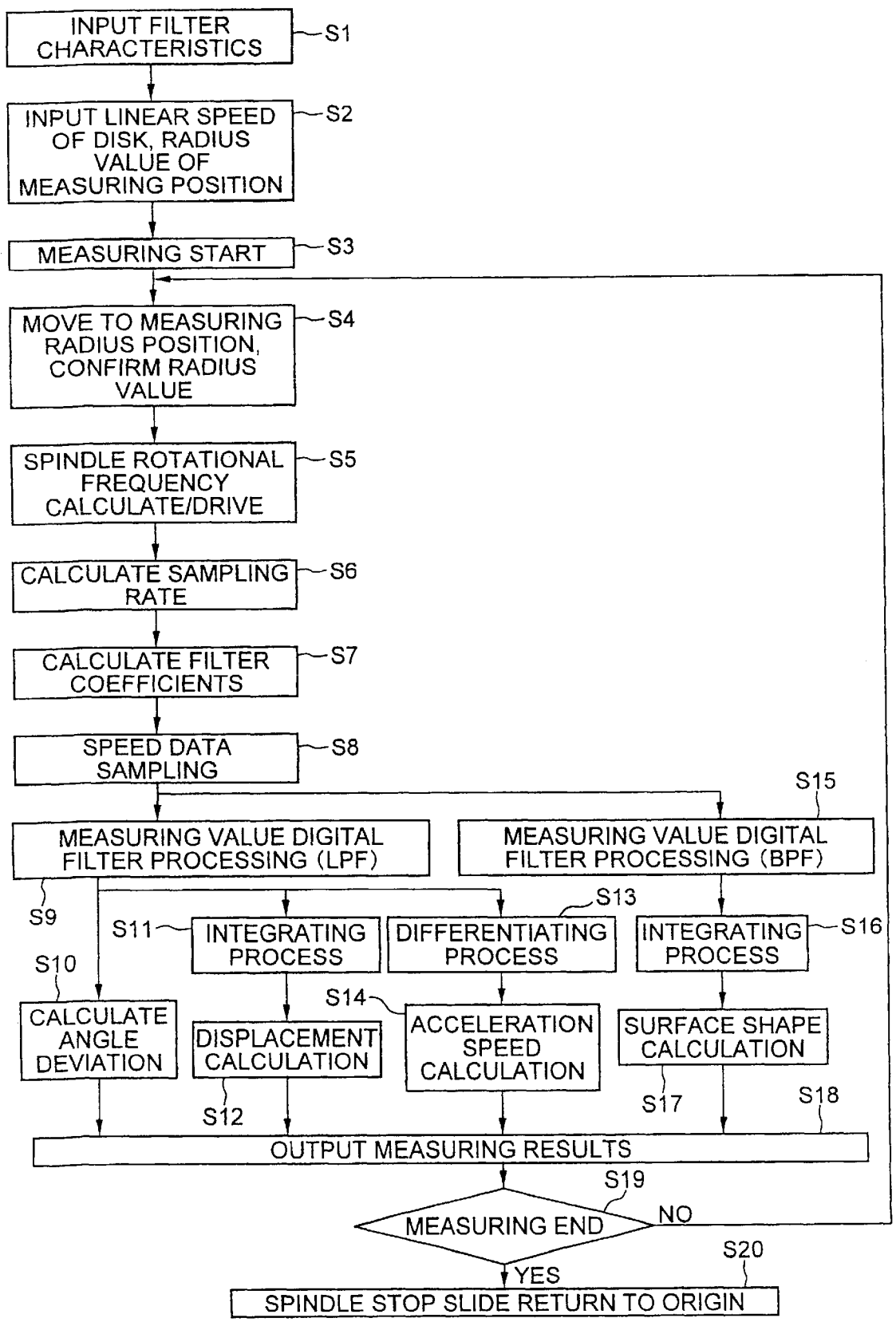
FIG. 5 is a flow chart for describing a planar shape characteristic measuring method using a planar shape characteristic measuring apparatus.

Next, an explanation will be made of a planar shape characteristic measuring method using a planar shape characteristic measuring apparatus 1 of the above configuration with reference to the flow chart shown in FIG. 5.

First, the filter characteristics of the focus servo error calculating unit 58 and the digital filtering unit 57 are input (step S1).

Moreover, the radius R of the optical disk D at a measuring position and the linear speed (scan speed) Lv at this radius R are input (step S2). Note that the number Sn of data samplings is input at this step.

When measuring starts (step S3), the control unit 54 moves the slide mechanism 8 so that the measuring position of the laser Doppler speed meter 11 reaches the position of the input radius R (step S4).

Further, the control unit 54 calculates the speed N of the spindle motor 2 from the input radius R and linear speed Lv and then drives the spindle motor (step S5).

On the other hand, the sampling rate calculating unit 55 calculates the sampling rate Sr based on the input radius R, the linear speed Lv, and the number Sn of data samplings (step S6).

Further, filter coefficients of the focus servo error calculating unit 58 and the digital filtering unit 57 are calculated based on the calculated sampling rate Sr and the input filter characteristic (step S7). Due to this, even if the sampling rate Sr changes, a constant filter characteristic is always obtained.

The control/processing apparatus 51 fetches the detected signal of the laser Doppler speed meter 11 from the analog-to-digital converter 74 at the calculated sampling rate Sr (step S8).

For example, when speed data of one rotation of the optical disk D is fetched, digital filter processing is carried out for this data in the digital filtering unit 57 (step S9).

The tilt angle calculating unit 61 calculates the tilt angle β in the rotational direction at each measuring position from the filtered speed data V and the input linear speed data Lv (step S10).

The displacement calculating unit 60 integrates the filtered speed data V (step S11) and then calculates the perpendicular direction displacement of the optical disk D (step S12).

The acceleration calculating unit 59 differentiates the filtered speed data V (step S13) and calculates the perpendicular direction acceleration of the optical disk D (step S14).

On the other hand, the focus servo error calculating unit 58 digitally filters (band-pass filters) the speed data detected by the laser Doppler speed meter (step S15), integrates this digital filter processed speed data V (step S16), and calculates the focus servo error (minute surface shapes of the optical disk D) (step S17).

Next, the calculation results are output on the display screen by the display unit 62 for example (step S18).

When measuring is finished (step S19), the drive of the spindle motor 2 is stopped, and the slide mechanism 8 is returned to the original position (step S20).

Figure 6:
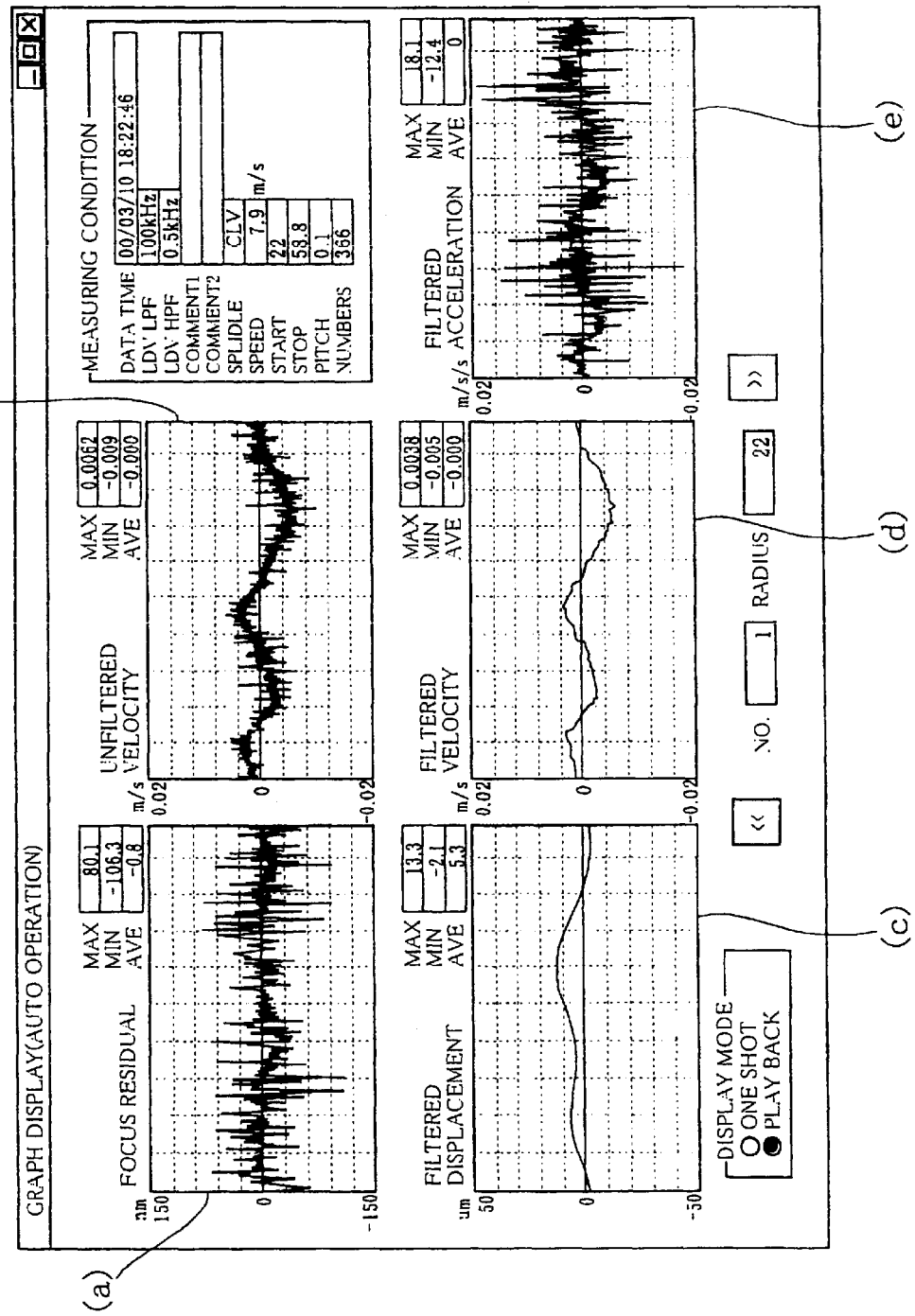
FIG. 6 is a view for describing an example of output on a display screen by a display unit.
Figure 7:
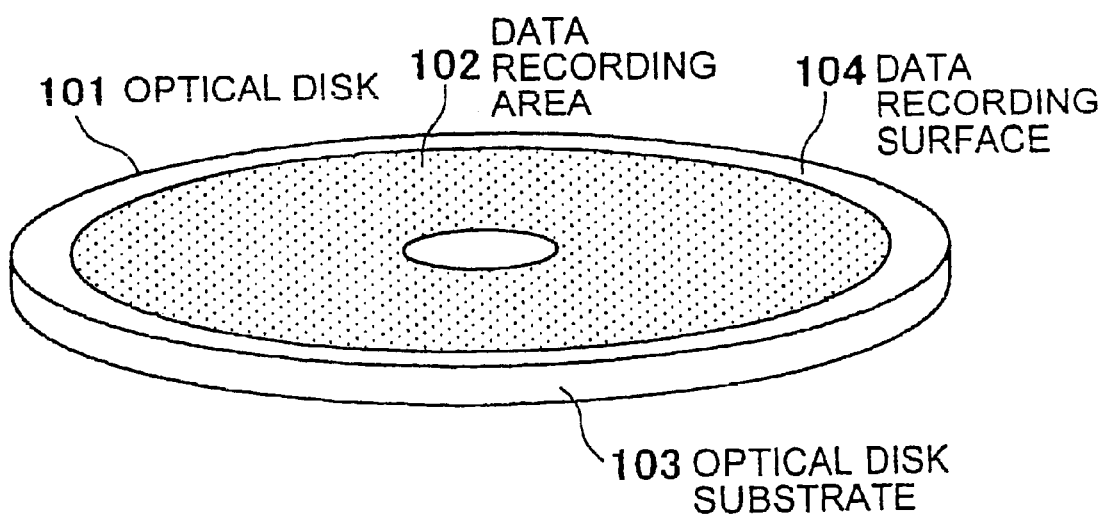
FIG. 7 is a view for describing the configuration of an optical disk.
Figure 8A:
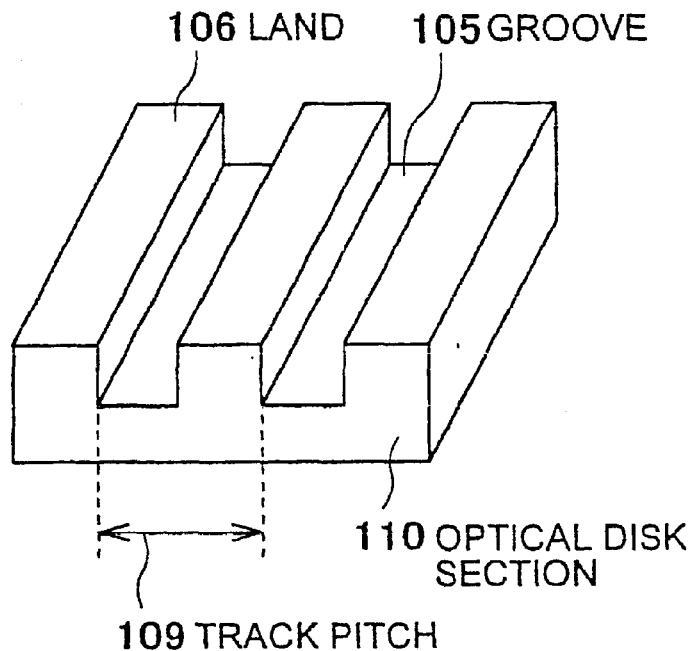
FIGS. 8A and 8B are views for describing an example of the structure of a data recording surface of an optical disk.
Figure 8B:
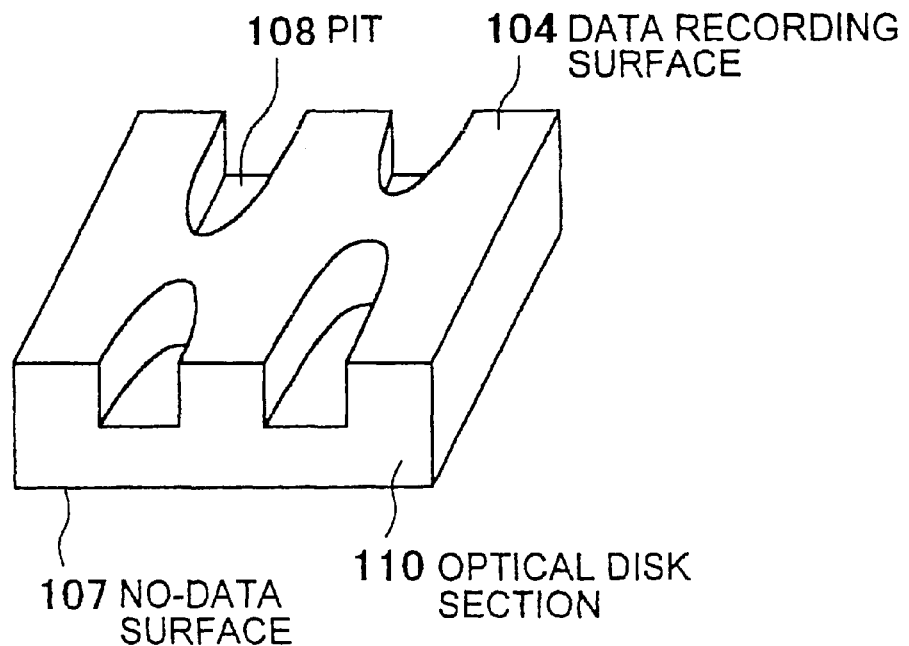
Figure 9:
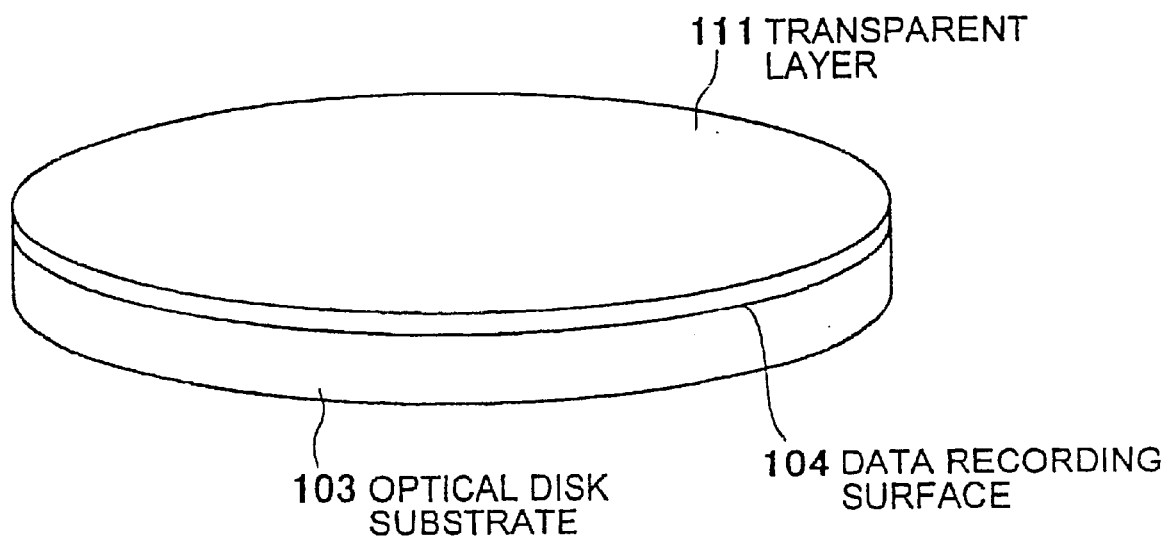
FIG. 9 is a perspective view for describing the layer structure of an optical disk.

Here, an example of the output by the display unit 62 on the display screen is shown in FIG. 6.

In FIG. 6, graph (a) shows the data obtained in the focus servo error calculating unit 58, graph (b) shows the unfiltered speed data V, graph (c) describes the data obtained in the displacement calculating unit 60, graph (d) describes the digitally filtered speed data V, and graph (e) describes the data obtained in the acceleration calculating unit 59.

Note that as shown in FIG. 6, the display unit 62 can also be configured to not only display one rotation of the optical disk D's worth of data, but also display the distribution of the calculated amount of focus servo error, displacement, acceleration, speed data, etc. in the optical disk D on the display screen to enable it to be grasped three-dimensionally.

As stated above, according to the present embodiment, because the tilt angle in the rotational direction (tangential skew) at a measuring position is calculated using the speed data V in a direction perpendicular to the data recording surface of the optical disk D detected by the laser Doppler speed meter 11 by noncontact means directly, the calculated value becomes very high in precision.

Further, according to the present embodiment, because the filter coefficients of the digital filtering unit 57 and the focus servo error calculating unit 58 are calculated in accordance with the sampling rate Sr so that the filter characteristics become predetermined filter characteristics, the accuracy of each calculated value can be stabilized.

Moreover, according to the present embodiment, it is possible to simultaneously calculate the perpendicular direction displacement, the acceleration, and the focus servo error of the focus servo system using the speed data V used for the calculation of the tilt angle in the rotational direction. Note that because the acceleration can be calculated from the first order differential of the speed data V, it becomes possible to improve the accuracy compared with the case of calculating the acceleration from data of displacement in a direction perpendicular to the data recording surface of the optical disk D.

In this way, according to the present embodiment, it is possible to measure various planar shape characteristics of the data recording surface of the optical disk D accurately and simply.

The present invention is not limited to the above embodiment.

In the embodiment above stated, the explanation was given with reference to an optical disk D as the disk of the present invention, but the present invention can measure not only a data recording surface of an optical disk, but also, for example, the planar shape characteristics of a stamper which forms the data recording surface of an optical disk and which may become the cause of surface vibration of the data recording surface of the optical disk. Further, the present invention may also be applied for measuring the planar shape characteristics of a disk-shaped recording medium such as a magnetic disk other than an optical disk.

Summarizing the effects of the present invention, according to the present invention, it is possible to measure characteristics relating to the shape of a measured surface of a disk such as the data recording surface of an optical disk precisely and efficiently.

While the invention has been described with reference to specific embodiment chosen for purpose of illustration, it should be apparent that numerous modifications could be made thereto by those skilled in the art without departing from the basic concept and scope of the invention.

What is claimed is:

1. A rotating disk characteristic measuring apparatus comprising:
   a speed detecting means for detecting a perpendicular direction speed of a measuring position of a measured surface of a rotating disk and
   a tilt angle calculating means for calculating a tilt angle in a rotational direction of said measured surface to a reference surface at the measuring position based on a linear speed at the measuring position detected by said speed detecting means and a detected perpendicular direction speed at the measuring position.

2. A rotating disk characteristic measuring apparatus as set forth in claim 1, further comprising:
   a digital filtering means for removing a noise component contained in said perpendicular speed data detected by said speed detecting means; and
   a filter coefficient calculating means for calculating a filter coefficient in accordance with a sampling rate of said speed detecting means so that a filter characteristic of said digital filtering means becomes a predetermined filter coefficient.

3. A rotating disk characteristic measuring apparatus as set forth in claim 1, wherein said tilt angle calculating means uses a value of said perpendicular direction speed divided by said linear speed as a tangent of said tilt angle and calculates said tilt angle by an inverse function of the tangent.

4. A rotating disk characteristic measuring apparatus as set forth in claim 1, further comprising:
   a rotating means for rotating said disk;
   a moving means for relatively moving said speed detecting means in the radial direction of said disk;
   an input means for inputting a radius of said disk at the measuring position detected by said speed detecting means and a target linear speed at said measuring position; and
   a control means for calculating a rotating speed for rotating said disk based on the input radius and target linear speed, rotating said disk at the calculated speed, and outputting a control command for moving said speed detecting means to the input radius of the measuring position.

5. A rotating disk characteristic measuring apparatus as set forth in claim 1, wherein said speed detecting means detects said perpendicular direction speed by a non-contact means at a measured surface of said disk.

6. A rotating disk characteristic measuring apparatus as set forth in claim 5, wherein said speed detecting means comprises a laser Doppler speed meter.

7. A rotating disk characteristic measuring apparatus as set forth in claim 1, wherein:
   said disk comprises a recording medium enabling at least one of optically recording and reproduction of information; and
   said measured surface comprises a data recording surface of said recording medium.

8. A rotating disk characteristic measuring apparatus as set forth in claim 1, further comprising:
   a displacement calculating means for calculating a perpendicular direction displacement of said measured surface based on the detected perpendicular direction speed;
   an acceleration calculating means for calculating a perpendicular direction acceleration of a measured surface of said disk at each detecting position based on the detected perpendicular direction speed; and
   a focus servo error calculating means for calculating an amount of focus servo error which does not enable tracking of unevenness of said measured surface predicted to occur in a servo system for making a predetermined object track a target position in a perpendicular direction from a measured surface of said rotating disk based on the detected perpendicular direction speed and a gain characteristic of said servo system.

9. A rotating disk characteristic measuring apparatus as set forth in claim 8, wherein:
   said object is an optical pickup for performing at least one of recording of information onto a data recording surface of said recording medium and reproduction of information from said data recording surface or a lens mounted on said optical pickup; and
   said servo system comprises a focus servo system for making the focus of the optical pickup or the lens mounted on said optical pickup track a target position in a direction perpendicular to said data recording surface.

10. A rotating disk characteristic measuring apparatus as set forth in claim 8, wherein said focus servo error calculating means comprises:
    a band-pass filter for removing high and low frequency noise components contained in detected perpendicular direction speed data; and
    an integrator for integrating by time series the output from said band-pass filter.

11. A rotating disk characteristic measuring method comprising:
    a speed detecting step for detecting a perpendicular direction speed of a measuring position on a measured surface of a rotating disk; and
    a tilt angle calculating step for calculating a tilt angle in a rotational direction of said measured surface with respect to a reference surface at the measuring position based on a linear speed of said measured surface at the measuring position and the detected perpendicular direction speed at the measuring position.

12. A rotating disk characteristic measuring method as set forth in claim 11, comprising:
    a filtering step for removing a noise component contained in speed data detected in said speed detecting step by a digital filter; and
    a filter coefficient calculating step for calculating a filter coefficient in accordance with a sampling rate of said speed detecting step so that a filter characteristic of said digital filter becomes a predetermined filter characteristic.

13. A rotating disk characteristic measuring method as set forth in claim 11, wherein said tilt angle calculating step uses a value of said perpendicular direction speed divided by said linear speed as a tangent of said tilt angle and calculates said tilt angle by an inverse function of the tangent.

14. A rotating disk characteristic measuring method as set forth in claim 11, wherein said speed detecting step comprises:

a step for inputting a radius of said disk at a measuring position and a target linear speed at said measuring position;

a step for calculating a speed for rotating said disk based on the input radius and target linear speed and for rotating said disk at the calculated speed; and a step for moving a predetermined speed detecting means which detects said perpendicular direction speed to the measuring position of the input radius.

15. A rotating disk characteristic measuring method as set forth in claim 11, wherein said speed detecting step detects said perpendicular direction speed by a noncontact means at a measured surface of said disk.

16. A rotating disk characteristic measuring method as set forth in claim 15, wherein said speed detecting step detects said perpendicular direction speed by a laser Doppler speed meter.

17. A rotating disk characteristic measuring method as set forth in claim 11, wherein:

a recording medium which enables at least one of optical recording and reproduction of information is used for said disk; and said measured surface comprises a data recording surface of said recording medium.

18. A rotating disk characteristic measuring method as set forth in claim 11, further comprising:

a displacement calculating step for calculating a perpendicular direction displacement of said measured surface based on the detected perpendicular direction speed;

an acceleration calculating step for calculating a perpendicular direction acceleration of a measured surface of said disk at each detecting position based on the detected perpendicular direction speed; and a focus servo error calculating step for calculating an amount of focus servo error which does not enable tracking of unevenness of said measured surface predicted to occur in a servo system for making a predetermined object track a target position in a perpendicular direction from a measured surface of said rotating disk based on the detected perpendicular direction speed and a gain characteristic of said servo system.

19. A rotating disk characteristic measuring method as set forth in claim 18, wherein:

said object is an optical pickup for performing at least one of recording of information onto a data recording surface of said recording medium and reproduction of information from said data recording surface or a lens mounted on said optical pickup; and said servo system comprises a focus servo system for making the focus of the optical pickup or the lens mounted on said optical pickup track a target position in a direction perpendicular to said data recording surface.

20. A rotating disk characteristic measuring method as set forth in claim 18, wherein said focus servo error calculating step removes high and low frequency noise components contained in the detected perpendicular direction speed data by a band-pass filter and calculates said amount of focus servo error by integrating by time series the output from this band-pass filter.

* * * * *